2,686,277

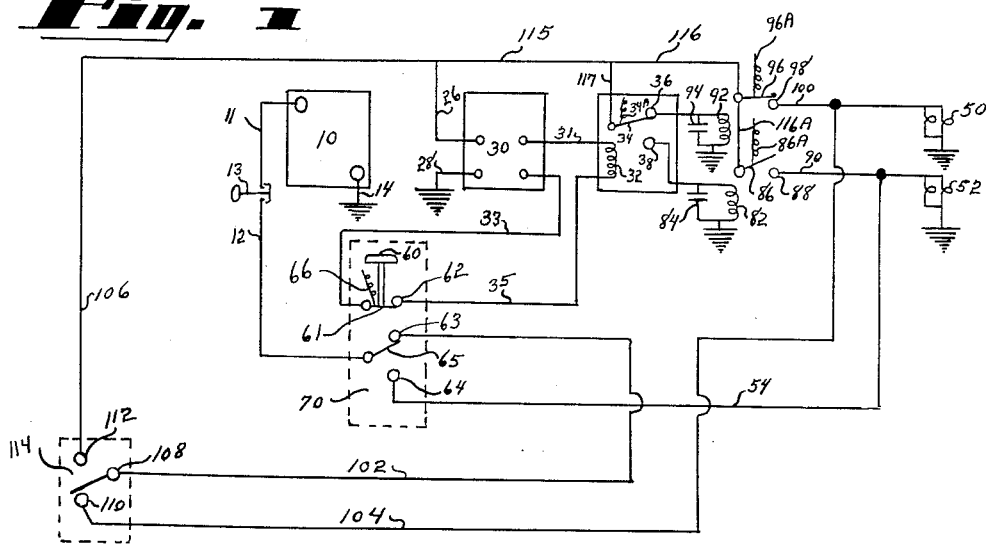

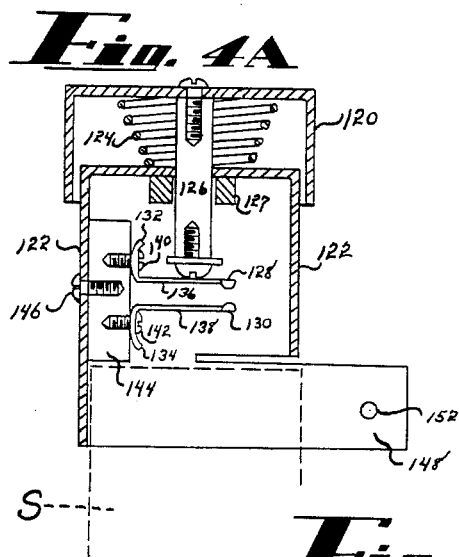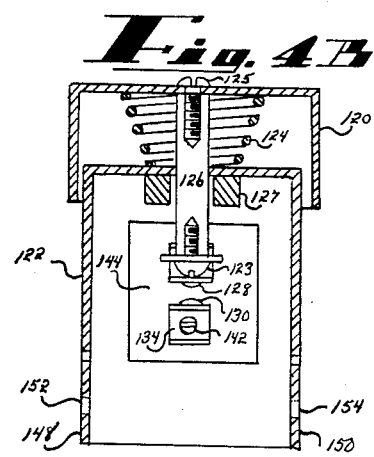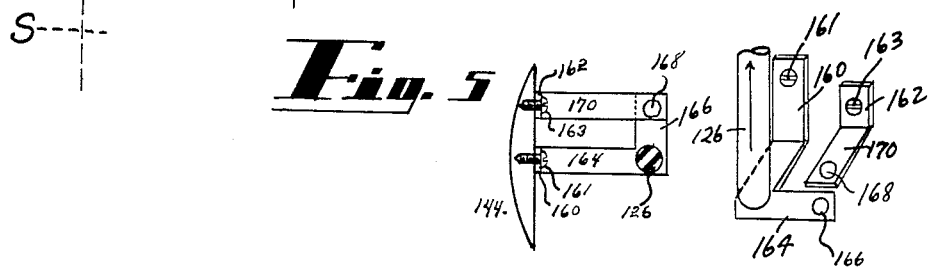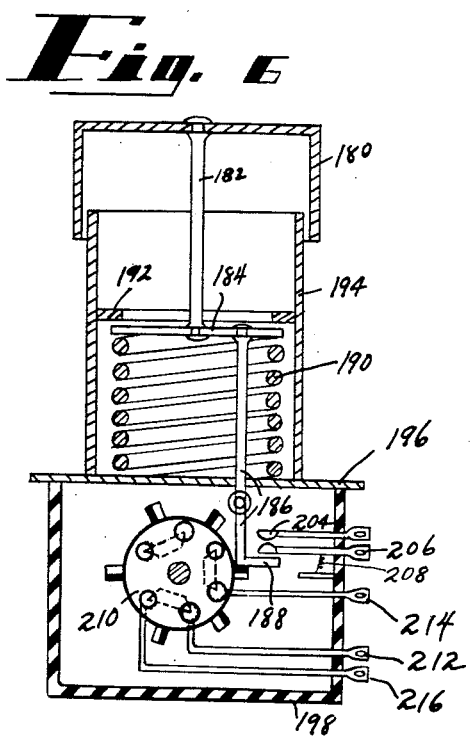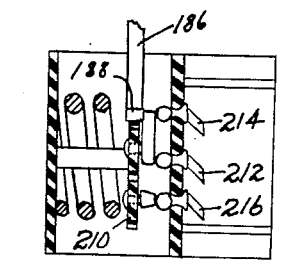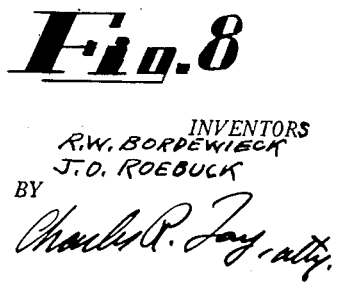
INVENTORS
R.W. BORDEWIECK
J.O. ROEBUCK Patented Aug. 10, 1954

UNITED STATES PATENT OFFICE 2,686,277

AUTOMATIC HEADLIGHT CONTROL DEVICE

Robert W. Bordewieck, Southboro, and James O. Roebuck, Worcester, Mass., assignors to Moore Electronic Laboratories, Incorporated, Worcester, Mass., a corporation of Massachusetts Application February 23, 1950, Serial No. 145,628

7 Claims. (Cl. 315—83)

This invention relates to improvements in the art of connecting an automatic headlight control device into a vehicle lighting system so as to obtain the advantages of both manual and automatic control without the use of a manual-automatic switch, wherein a new type of foot switch is employed, which when pressed lightly, causes the lights to switch from low beam to high beam and when pressed further causes the low beam lights to be switched on.

The method for accomplishing this involves a special switching system and circuit, and the use of a switch to short circuit the coil of the output relay headlight control device to de-energize it; or a switch may be opened in the circuit of the output relay which would also de-energize it.

The system described provides for manual operation on low beam lights in case the unit or its switching circuits should fail. The fundamentals in any method disclosed for de-energizing the relay in the output of the automatic headlight control could not be used with any photo relay circuit and the disclosures herein contained, should be interpreted also as applying to de-energization of other types of photo relay circuits. In some cases it is undesirable to short circuit the relay, but in all cases the relay circuit may be opened without detriment.

Other objects and advantages of the invention will appear hereinafter.

Reference is to be had to the accompanying drawings in which

Fig. 1 is a schematic wiring diagram of one form of the invention which also employs a manual-automatic switch, wherein a push-to-open switch is used to de-energize the relay;

Fig. 2 is another schematic wiring diagram wherein the manual-automatic switch is deleted and a short circuiting switch is used to de-energize the output relay;

Fig. 3 shows another optional schematic wiring diagram wherein there is no option of automatic control, but a push-to-open switch is used to de-energize the output relay of the automatic headlight control;

Figs. 4A and 4B are vertical sections showing a form of an adapter switch to be used with the present automobile foot switch to make a combined single switch to perfrom the functions indicated in Fig. 2, wherein a push-to-short switch is desired;

Fig. 5 shows a modification of the contacts of the switch of Fig. 4 to make it a push-to-open switch as is required for Figs. 1 and 3;

Fig. 6 is a section through a single combined switch designed to operate as a push-to-open switch such as is required in Figs. 1 and 3;

Fig. 7 is a perspective view of the switch contacts of Fig. 5, and

Fig. 8 is a detail view showing a side view of the electrical parts of the ratchet switch mechanism in Fig. 6.

In Fig. 1, a battery 10 is connected from one terminal by line 14 to ground, and by the other terminal by line 11 through switch 13, and by line 12 to the armature 65 of a special foot switch 70, and thence through contact 64 and line 54 to low beam filaments 52 of a vehicle headlight system; or selectively through contact 63 and line 102 to the armature at 108 of a manual-automatic switch 114, which when connected onto contact 110 allows current to flow through line 104 to the high beam filaments 50 of the vehicle lighting system. The operation described to this point is the conventional manual foot switch control of a vehicle lighting system, wherein manipulation of switch 70 from contact 63 to 64, switches the lights from high beam to low beam, or low beam to high beam, as by a ratchet switch.

However, if switch 114 has its armature 108 connected to contact 112 and armature 65 of switch 70 is connected to contact 63, current will flow from the battery through line 11, switch 13, line 12, armature 65, contact 63, line 102, armature 108, contact 112, line 106, and line 26, to the power supply of an automatic headlight control unit 30; and by lines 115 and 117 to the armature 34 of the output relay 32 of the automatic headlight control unit; and by line 116 and 116A to the armatures 86 and 96 of relays 82 and 92. When in this position, automatic headlight control 30 will be energized and the current flowing through the coil 32 in its output circuit will vary in accordance with the illumination striking the light sensitive pickup elements of the automatic headlight control, as for instance may be of the type shown in Pat. No. 2,493,307, January 3, 1950.

Relay coil 32 is connected by line 31 to the automatic headlight control 30 and by line 35 armature 61 of switch 70, contact 62, and line 33 to the automatic headlight control output circuit. Thus if switch button 60 of switch 70 is depressed slightly, armature 61 will break contact and the coil 32 will become de-energized thereby permitting the armature 34 to be pulled by its spring 34A onto contact 36, regardless of the light signal existent on the automatic headlight control 30. Current will flow from the armature 34 to contact 36, and thence through the relay coil 92 to ground, pulling armature 96 of relay 92 onto contact 98 and thereby allowing current to flow through armature 96, contact 98, and line 100 to the high beam filaments 50. If switch buttom 60 is not depressed and sufficient light is available to actuate the automatic headlight control 30, relay coil 32 will pull armature 34 onto contact 38 thereby causing current to flow through armature 34, contact 38 through coil 82 and thence to ground thereby de-energizing coil 92 and energizing relay coil 82, allowing spring 96A to open contact 98 and causing armature 86 to be pulled onto contact 88, thus allowing current to flow through armature 86, contact 88 and line 90 to low beam filaments 52. Condensers 84 and 94 are connected across the slave relays 82 and 92 to prevent voltage surges from disturbing the electronic circuit of automatic headlight control 30.

The operation of this circuit is as follows: When switch armature 108 is on contact 110, the automatic headlight control unit is inoperative and manual control is accomplished by the ratchet type foot switch 70, wherein successive thrusts on switch button 60 alternately cause armature 65 to switch from contact 63 to contact 64 and back to contact 63. When switch armature 108 is connected to contact 112 and armature 65 of switch 70 is connected onto contact 63, high beam filaments 50 will be energized in the circuit so long as relay coil 32 is not sufficiently energized to pull armature 34 onto contact 38. When sufficient light strikes the pickup of automatic headlight control 30, relay coil 32 pulls armature 34 onto contact 38 and high beam lights 50 are de-energized through slave relay 92 and low beam lights 52 are energized through slave relay 82. If the light striking the pickup of the automatic headlight control 30 is decreased sufficiently, relay coil 32 will become de-energized and spring 34A will return armature 34 to contact 36 thereby de-energizing low beam lights 52 and re-energizing the high beam lights 50 again through slave relays 82 and 92. If when relay 32 is energized and the lights are on low beam it is desired to operate on high beam or to flash a signal with the high beam lights, a slight pressure on button 60 of switch 70 will open the circuit of relay coil 32, de-energizing the relay and allowing high beam lights to stay on so long as button 60 is held thus lightly depressed. However, if button 60 is released and armature 61 re-closes to contact 62, coil 32 will immediately be re-energized and the lights will return to low beam providing there is still sufficient illumination on the pickup of the automatic headlight control 30 to cause relay 32 to become energized. If, when insufficient light is striking the automatic headlight control to cause it to energize its relay, it is desired to operate on low beam, foot switch 70 can be depressed and switch armature 65 connected to contact 64 thereby disconnecting the automatic headlight control from the system and switching lights manually onto low beam. If it is desired to remain on low beam through a city, foot switch 70 would be so actuated. When it is desired to return to automatic control, foot switch 70 is again actuated and armature 65 returned to contact 63. After a slight warm up period, the vehicle would again operate efficiently on its automatic headlight control system.

Referring to Fig. 2, all of the numerals included have the same functions as in Fig. 1. However, the option of an auxiliary switch for manual automatic control is deleted and contact 63 is always connected so as to energize the automatic headlight control and supply the armature of relay 32 with power. In addition to deleting the manual automatic switch 114, switch 80 replaces switch 70 and button 60 now causes armature 74 to close onto contact 76 when depressed slightly instead of opening a contact as in Fig. 1. The switch 80 is connected so that line 37, armature 74 and contact 76 and line 39 constitutes a short circuit across relay coil 32 when the switch is depressed. Since short circuiting a relay de-energizes it as effectively as opening its circuit, the operation resulting from this change in connections is the same as before. Because of the deletion of the manual automatic switch there is no possibility of feed back through the contacts of relay 32 when operating on manual, and contact 36 is connected by line 56 directly to the high beam lights 50, and contact 38 is connected directly by line 58 to the low beam lights 52.

The operation of this circuit is as follows: Current will flow from battery 10 through line 11, switch 13, line 12, to armature 65 of switch 80, and thence by contact 64 and line 54 directly to low beam lights 52, or selectively by contact 63 and lines 72 and 24 to energize the automatic headlight control 30, and by line 78 to the armature 34 of relay 32 and thence through contact 36 and line 56 to high beam filaments 50, or through contact 38 and line 58 to the low beam filaments 52. When sufficient light falls on the photo-sensitive pickup of the automatic headlight control 30, output coil 32 will pull armature 34 onto contact 38 causing the high beam lights to be de-energized and low beam lights energized. When light is removed from the pickup of the automatic headlight control 30, relay 32 is de-energized and spring 34A returns armature 34 to the high beam contact 36 switching off the low beam lights and switching on the high beam lights. If, when the unit is operating on high beam lights it is desired to switch manually to low beam lights, a push of switch 80 will switch armature 65 from contact 63 to contact 64 thus de-energizing the automatic headlight control and putting the lights on manual low beam. If, with the automatic headlight control operating on low beam it is desired to return the lights to high beam to flash a signal or for any other reason, a light pressure on button 60 will cause relay coil 32 to be short circuited thus de-energizing this relay and returning the lights to high beam so long as button 60 is held lightly depressed. It will be seen that this circuit has all the advantages of an automatic headlight control system as well as allowing the operator to run on manual low beam, or to flash his high beam lights on any time this is desired or necessary.

Referring to Fig. 3 a slight modification of Fig. 2 is shown wherein switch 80 is replaced by the original switch 70 and a light pressure on button 60 opens the circuit of relay coil 32 thus de-energizing the relay. The operation of this circuit and the results obtained are exactly identical to Fig. 2 with this one exception.

Referring now to Fig. 4A, a vertical section of an adaptor switch is shown. Fig. 4B shows a section at right angles of the same switch. This switch is so constructed that it can be clamped on top of a conventional vehicle foot light switch S to convert this switch to that used in Fig. 2, wherein a small thrust closes the push-to-short switch, and a heavy thrust actuates the conventional foot dimming switch. Cap 120 is mounted on cylinder 122 by means of a spring 124, and there being an insulating shaft 126 attached to the cap 120 so that a small thrust on cap 120 pushes the insulating shaft 126 down forcing contact 128 onto contact 130 and thus closing the circuit between the lugs 132 and 134 attached to terminals 128 and 130 respectively by Phosphor bronze flat springs 136 and 138 respectively. Screws 140 and 142 secure the lugs 132 and 134 respectively to a molded insulating material 144 which is in turn secured by screw 146 to the side wall of cylinder 122. The bottom part of the cylinder 122 is opened up providing two flaps 148 and 150 with holes 152 and 154 for a clamp screw to clamp the assembly to the top of the conventional foot switch S.

It will be seen that a small application of pressure on cap 120 forces contacts 128 and 130 together, thereby providing the desiring shorting action, whereas a heavy application of pressure on cap 120 compresses spring 124 and the thrust is passed on through the clamped bands 148 and 150 to the top of the conventional vehicle foot switch, not shown.

Referring to Figs. 5 and 7, a modification is shown of the contacts used in Figs. 4A and 4B. Lugs 160 and 162 are secured by screws 161 and 163 respectively to the insulating material 144 as was used in Fig. 4. However, these terminals are mounted so that the insulating shaft 126 bears on spring 164, to push contact 166 away from contact 168 upon the application of small pressure, thereby providing a push-to-open switch for use in the circuit for Fig. 1 or Fig. 3.

Referring to Fig. 6 a combination switch is shown, which will perform both the functions of the push-to-open switch and the normal ratchet switch. A cap 180 is secured to a shaft 182 which is in turn secured to a disk 184, and disk 184 is in turn secured to a rod 186 which has a small right angle foot 188 on the end thereof, and a pivot to allow the foot to act as a pawl. A spring 190 holds disk 184 against collar 192, which is secured to cylinder 194 in turn secured to plate 196. Container 198 is also secured to plate 196. Contacts 204 and 206 are normally held closed by the pressure of rod foot 188 when spring 190 has pushed disk 184 against collar 192. A light pressure on cap 180 will release this force and spring 208 will pull contact 206 down thereby opening the circuits between contacts 204 and 206.

Greater pressure will cause foot 188 to rotate switch disk 210 of the usual ratchet switch to change contacts from 212 to 214 to 212 to 216. Actually, the housing 122 of Fig. 4A accomplishes the function of rod 186 when it descends but in any case, the switches of Figs. 4 to 8 conform to switches 60, 70 and 60, 80 of Figs. 1–3 inclusive.

Having thus described our invention and the advantages thereof, we do not wish to be limited to the details herein disclosed otherwise than as set forth in the claims, but what we claim is:

1. The combination with vehicle high and low multifilament headlights, a master on and off switch therefor, an automatic control thereof employing a relay switch, mechanical means to hold the relay in position to energize one filament, and a coil to hold the relay in position to energize the other filament upon energization of the coil, of a selector switch digitally operable at the will of the operator to render the coil ineffective, and means normally maintaining the last named switch in position so that the relay coil is effective, so that constant pressure thereon is necessary to keep the coil ineffective, and means to keep the coil effective at all times except when either the master switch is open or the selector switch is actuated.

2. The combination of claim 1 including a third switch to alternately energize the filaments, and mechanical means enabling operation of the third switch only after actuation of the second switch.

3. The combination in a vehicle headlight system of a switch mechanism, a single pole double throw relay, a pair of dual-filament headlamps, and a source of energy for energizing said lamp filaments, said switch mechanism including a single pole double throw selector switch of the stepping type for manually controlling the selection of filaments to be operated in said headlamps as well as including the normally closed contacts which constitute a single pole single throw switch connected in series with the excitation coil of said relay, said relay being an integral part of a system for automatically controlling the selection of filaments to be operated in said headlamps, one side of said source of energy and the junction of the dual filaments in said headlamps being connected together, whereas the other side of said source of energy is connected to the armature of said manually controlled selector switch, one of the selector terminals of said selector switch being connected through the armature and normally closed contact of said relay to the high beam filaments of said headlamps, and both the second selector terminal of said selector switch and the normally open contact of said relay being connected to the low beam filaments of said head lamps.

4. The combination in a vehicle headlight system of a switch mechanism, a single pole double throw relay, a pair of dual filament headlamps, and a source of energy for energizing said lamp filaments, said switch mechanism including a single pole double throw selector switch of the stepping type for manually controlling the selection of filaments to be operated in said headlamps as well as including the normally open contacts which constitute a single pole single throw switch connected in parallel with the excitation coil of said relay, said relay being an integral part of a system for automatically controlling the selection of filaments to be operated in said head lamps, one side of said source of energy and junction of the dual filaments in said head lamps being connected together, the other side of said source of energy being connected to the armature of said manually controlled selector switch, one of the selector terminals of said selector switch being connected through the armature and normally closed contact of said relay to the high beam filaments of said head lamps, and both the second selector terminal of said selector switch and the normally open contact of said relay being connected to the low beam filaments of said headlamps.

5. The combination with vehicle high and low beam headlight filaments and an automatic control therefor dependent on the quantity of light present to actuate the same and including a relay to shift energization from one filament to the other, a pair of contacts normally open and operator actuated by means of a switch mechanism to close a line short circuiting the relay and causing the latter to be inoperative, said switch mechanism comprising a pair of normally open contacts, movable means to actuate these contacts, and a spring resisting actuation thereof, of a second two position ratchet type of switch actuated by said means positioned to require greater movement on the part of said means for actuation thereof than the movement required for actuation of the aforesaid normally open contacts so that the latter are always actuated first and the ratchet switch is not actuated except upon further effort applied after actuation of the normally open contacts, and wherein the said second switch energizes the low beam headlight filaments and the automatic headlight control relay armature in its two alternative positions.

6. The combination with vehicle high and low beam headlight filaments and an automatic control therefor dependent on the quantity of light present to actuate the same and including a relay to shift energization from one filament to the other, of a pair of contacts normally closed and digitally actuated by means of a switch mechanism to open the energizing line to the said relay to render the same inoperative, said switch mechanism comprising a pair of normally closed contacts, movable means to actuate the contacts, and a spring resisting actuating thereof, wherein a second two position ratchet type switch actuated by the said means is positioned to require greater movement on the part of the said means for actuation thereof than the movement required for actuation of the normally closed contacts so that the latter are always actuated first and the switch is not actuated except upon further effort applied after opening of the contacts, and wherein the said second two position ratchet switch energizes the low beam headlight filament and the automatic headlight control in its two alternative positions.

7. The combination with vehicle high and low multifilament headlights, an automatic control therefor employing a relay switch having a coil, mechanical means to hold the relay in position to energize the high filament, and a coil to hold the relay in position to energize the low filament upon energization of the coil of the relay switch, of a single pole pressure switch and housing operable at the will of the operator to render the coil ineffective, and means normally maintaining the last named pressure operable switch in position so that the relay coil is effective and so that the constant pressure thereon is necessary to keep the coil ineffective, and wherein an additional push type ratchet switch with the aforementioned housing adapted to be mounted directly thereon so that pressure on the housing will actuate the ratchet switch and the single pole switch in the housing, means on the housing to actuate the ratchet switch and resilient means resisting the switch actuating means, so that pressure on the latter first causes actuation of the pole single switch and increased pressure causes actuation of the ratchet switch, said single pole switch being actuable without actuating the ratchet switch.

References Cited in the file of this patent

UNITED STATES PATENTS

| Number | Name | Date |
|---|---|---|
| 1,948,198 | Blake | Feb. 20, 1934 |
| 2,431,394 | Friedman | Nov. 25, 1947 |
| 2,493,307 | Moore | Jan. 3, 1950 |
| 2,598,420 | Onksen | May 27, 1952 |